June 2, 1953     R. C. MILES     2,640,408
VENTILATING ATTACHMENT FOR AUTOMOBILES
Filed July 16, 1951
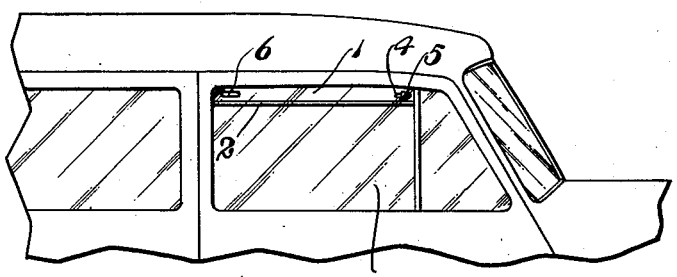
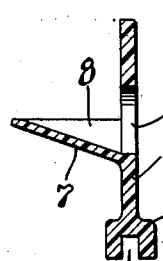
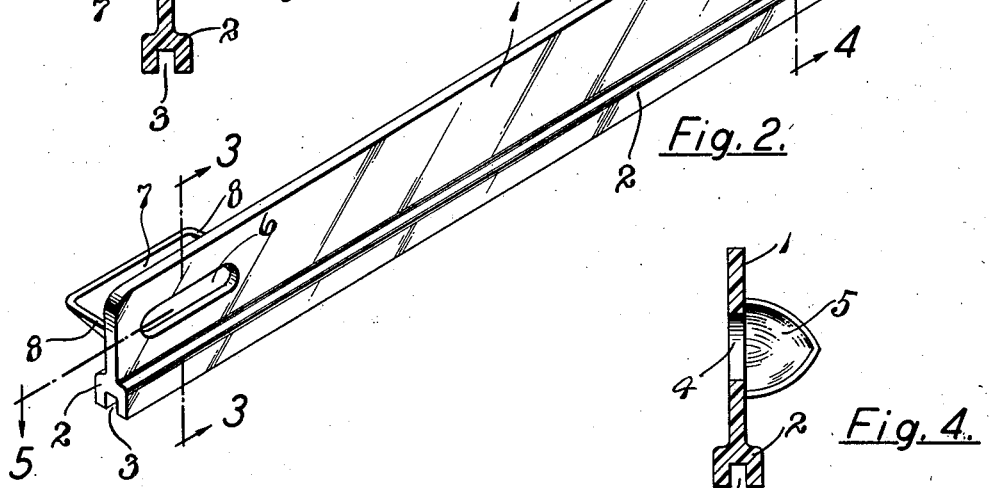
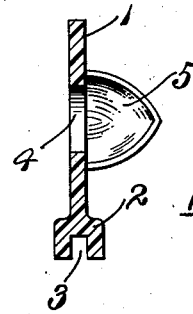
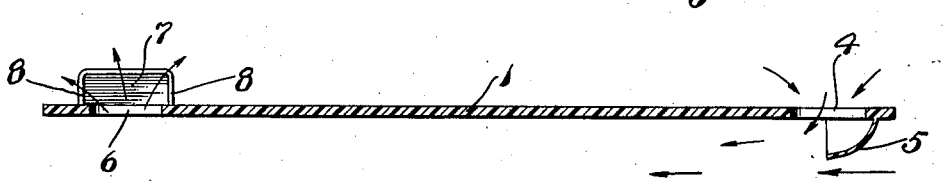
INVENTOR.
Robert C. Miles
BY Frank E. Liverance Jr.
Attorney Patented June 2, 1953

2,640,408

UNITED STATES PATENT OFFICE 2,640,408

VENTILATING ATTACHMENT FOR AUTOMOBILES

Robert C. Miles, Charlevoix, Mich.

Application July 16, 1951, Serial No. 236,885

4 Claims. (Cl. 98—2)

This invention is concerned with a novel, simple and very practical and effective ventilating attachment for automobiles, by means of which when attached to an automobile window, or more than one of them, with such windows closed, the interior of the body may have fresh air received therein, taking the place of other contaminated air which is automatically withdrawn from the interior of the body as the automobile is driven over the road. A steady flow of fresh air into the body takes place at the times when the windows are closed, as when it is raining or the temperature is low.

With my invention, the attachment which I have provided may be immediately applied in conjunction with a window of the automobile body at any time when it is desired, there being no requirement of attaching means, such as bolts, screws, clips or the like, and such attachment may be as quickly and readily removed. Further with my invention the attachment which is to be located at the upper edge of a window of an automobile, between it and the upper side of the window frame or opening, is preferably made of clear transparent material which corresponds to the clear transparent glass of the window, resulting in a desirable appearance and without detracting from appearance. Moreover, with my invention, at times when it is raining and the windows are closed, while fresh air is continually supplied to the interior of the automobile body, the rain is substantially if not entirely excluded. And at all times the air which is supplied to the body is directed upwardly and inwardly over the heads of the passengers without subjecting them to undesirable drafts.

An embodiment of my invention and the structure thereof by means of which the objects and purposes recited may be obtained, may be understood from the following description, taken in connection with the accompanying drawing, in which, Fig. 1 is a fragmentary side elevation of an automobile body showing my invention applied to one of the glass windows thereof, which windows are mounted for raising and lowering in the usual manner.

Fig. 2 is a perspective view of the attachment in its entirety.

Fig. 3 is a transverse vertical section substantially on the plane of line 3—3 of Fig. 2.

Fig. 4 is a similar section on the plane of line 4—4 of Fig. 2, and

Fig. 5 is a longitudinal horizontal section substantially on the plane of line 5—5 of Fig. 2 looking in a downward direction.

Like reference characters refer to like parts in the different figures of the drawing.

The attachment comprises a bar 1, preferably of a clear and transparent plastic material, though it may be of any suitable material. Such bar 1, at the lower edge thereof and for its full length, has an integral thickened rail 2, lengthwise of which and in its under portion is a continuous groove 3, the width of which is such that the upper edge of the glass window of an automobile may be received therein. The thickness of the bar 1 is substantially the same thickness as that of the window so that at its upper edge it is adapted to be received in the groove at the upper frame member into which normally the upper edge of the window is received. Thus, when the attachment is connected with the upper edge portion of a vertically movable automobile window with the window in a down position, on raising the window the attachment bar 1 is held securely between the window and its upper frame member.

At the front end portion of the bar 1 a horizontal slot 4, closed at both ends, is provided therethrough. At the outer side of the bar 1 and at the front end portion of the slot 4 a hood or shield 5 of substantially the shape best shown in Fig. 2 is molded with the bar 1, at its rear end being open and of a shape such that it is otherwise closed. When applied at the upper edge of an automobile window, with the window closed and with the automobile driving in a forward direction, the outside air riding upon the outer surfaces of the hood or shield 5 and being directed outwardly thereby, causes an air withdrawing action through the slot 4 to withdraw air from within the body to the outside through such slot.

At the rear end portion of the bar 1 a second horizontal slot 6, closed at both ends, is made therethrough. From the lower edge of the slot 6 a ledge 7 extends upwardly and inwardly, molded integrally with the bar 1. Preferably, vertical ends 8 are made integral with the bar 1 and the ledge 7 at each end of the ledge as best shown in Fig. 3.

The outward flow of air through the slot 4 causes a replenishment of the air withdrawn from the body by an inflow from the outside through the slots 6. Such air striking the upwardly inclined ledge 7, is directed upwardly and inwardly toward the under side of the top of the body. Raindrops passing through the slot 6, being heavier, will come against the upper side of the inclined ledge 7 and will flow back through the slot 6 by gravity and will not be carried to the interior of the body.

In Fig. 1, the attachment is shown at the upper edge of a front window 9 as it is when in use, the window and the attachment closing the front opening which normally, without the attachment, is completely closed by the window alone. It is evident that such attachment may be used, one or more of them, in connection with one or more of the vertically movable glass windows of the automobile though, in practice, the front windows usually will have the attachment supplied thereto irrespective of how many of the attachments may be used.

As stated, this attachment may be applied almost instantly without use of tools or attaching devices and when, during warm weather or at any other times when the windows are lowered, any or all attachments may be quickly removed. It may be molded complete in a single unit and is capable of large quantity production at relatively low cost.

The invention is defined in the appended claims and is to be considered comprehensive of all forms of structure coming within their scope.

I claim:

1. A ventilating attachment adapted to be located above and between the upper edge of a vertically movable automobile side window and the upper member of the frame of the window comprising, a flat horizontal elongated bar having front and rear ends and inner and outer sides when applied to said window and having an opening therethrough adjacent each end thereof, said openings being spaced from each other a distance approximating the length of the bar less the sum of the dimensions of the openings in the direction of the length of said bar, said bar at its lower portion having a thickened rail integral therewith extending the full length of the bar, said rail at its under side having a groove therein adapted to receive the upper edge of an automobile window glass, the thickness of said bar and the width of said slot being substantially equal to the thickness of an automobile window glass, and a hood at the front and outer side of said bar projecting outwardly therefrom, said hood being open at its rear end and covering the forward portion of said front opening in the bar, said hood having outwardly and rearwardly extending sides adapted to direct outside air coming to the hood when the automobile is being driven in a forward direction outwardly and away from the bar, thereby inducing outward flow of air through the front opening in said bar from within the automobile, the rear opening passing air inwardly therethrough to inside the automobile to compensate for that passing outwardly through the front opening.

2. A structure as defined in claim 1 and a ledge integrally connected with said bar at its inner side and at the lower side of the rear opening of said bar, said ledge extending upwardly and inwardly away from the bar.

3. A ventilating attachment for automobile windows comprising, an elongated flat bar of a transparent material adapted to be located in a vertical plane at the upper edge of an automobile side window and between it and the upper side of the window opening in an automobile, said bar when installed in an automobile having front and rear ends and inner and outer sides, and said bar having horizontal slots, one adjacent its front end and one adjacent its rear end generally in horizontal alignment and said bar at its lower edge having a continuous groove into which the upper edge of an automobile window glass is adapted to be received, means at the outer side of said bar at the front thereof partly covering the front portion of the front slot in the bar against which outside air is adapted to engage when the bar installed in an automobile is moved forwardly on driving the automobile in a forward direction, for projecting air outwardly and away from the bar to induce a flow of air from the inner side and within the automobile through the front slot therein, said slot at the rear end of the bar passing air from outside the automobile on which installed, through the slot at its rear end, into said automobile.

4. A structure as defined in claim 3, and a flat ledge integral with the bar at its inner side and extending upwardly and inwardly from the lower side of the rear slot in the bar, said ledge at each end having an upwardly extending generally vertically positioned end portion between its upper side and the adjacent inner side of the bar.

ROBERT C. MILES.

References Cited in the file of this patent

UNITED STATES PATENTS

| Number | Name | Date |
|---|---|---|
| 1,457,959 | Braucher | June 5, 1923 |
| 1,588,653 | Brownlee | June 15, 1926 |
| 1,728,777 | Trier | Sept. 17, 1929 |
| 1,825,192 | Mace | Sept. 29, 1931 |
| 1,978,399 | Blakeslee | Oct. 30, 1934 |